United States Patent
Franke et al.

(10) Patent No.: US 7,311,264 B2
(45) Date of Patent: Dec. 25, 2007

(54) METHOD AND DEVICE FOR THE PROCESS REGULATION OR CONTROL OF THERMAL LOAD CHANGES OF AN OBSTRUCTION-CURVED AND/OR THICK-WALLED COMPONENT THROUGH WHICH A MEDIUM FLOWS IN A THERMAL SYSTEM

(75) Inventors: Rüdiger Franke, Mannheim (DE); Klaus Krüger, Altrip (DE); Manfred Rode, Wiesloch (DE)

(73) Assignee: ABB Research Ltd, Zurich (CH)

( * ) Notice: Subject to any disclaimer, the term of this patent is extended or adjusted under 35 U.S.C. 154(b) by 660 days.

(21) Appl. No.: 10/802,079

(22) Filed: Mar. 15, 2004

(65) Prior Publication Data

US 2004/0178280 A1 Sep. 16, 2004

(30) Foreign Application Priority Data

Mar. 14, 2003 (DE) .................. 103 11 223

(51) Int. Cl.
  *G05D 23/00* (2006.01)
  *G01N 25/18* (2006.01)
  *G01K 17/00* (2006.01)
(52) U.S. Cl. ............... 236/93 R; 165/287; 374/44; 374/30; 374/15
(58) Field of Classification Search ........... 62/259.2; 236/93 R; 165/287, 276, 277; 374/44, 29, 374/30, 15
  See application file for complete search history.

(56) References Cited

U.S. PATENT DOCUMENTS

| | | | | |
|---|---|---|---|---|
| 3,256,734 A | * | 6/1966 | Storke, Jr. ................. | 374/43 |
| 4,593,527 A | * | 6/1986 | Nakamoto et al. ........... | 60/660 |
| 4,653,934 A | * | 3/1987 | Pursley ....................... | 374/31 |
| 4,902,139 A | * | 2/1990 | Adiutori ..................... | 374/137 |
| 4,916,715 A | * | 4/1990 | Adiutori ..................... | 374/29 |
| 5,772,329 A | * | 6/1998 | Bardon et al. .............. | 374/179 |
| 5,816,706 A | * | 10/1998 | Heikkila et al. ............ | 374/134 |
| 6,824,305 B1 | * | 11/2004 | Boyd et al. ................. | 374/29 |

FOREIGN PATENT DOCUMENTS

DE     199 10 222 C2     9/2000

OTHER PUBLICATIONS

Carslaw and Jaegar, Conduction of Heat and Solids, 2nd Edition.*

(Continued)

*Primary Examiner*—Chen-Wen Jiang
(74) *Attorney, Agent, or Firm*—Laurence A. Greenberg; Werner H. Stemer; Ralph E. Locher (57) ABSTRACT

The novel method and device provide for process control—closed-loop control or open-loop control—for a thermal system with an obstruction-curved and/or thick-walled component through which a medium flows. The wall temperatures of the component are detected, the heat flux density of the heat flux from the medium into the wall of the component is determined, the respective heat transmission coefficient is determined, using the wall temperatures. The heat flux density, and the heat transmission coefficient thus determined are used to influence the medium properties, with the heat stresses in the component being taken into account.

11 Claims, 6 Drawing Sheets

OTHER PUBLICATIONS

H.S. Carslaw et al.: "Conduction Of Heat In Solids", Oxford, *At the Calrendon Press*, 1959, $2^{nd}$ ed., pp. 332-334.

Pich, R.: "Näherungsgleichungen zur Abschätzung der instationären Wärmespannungen in krümmungsbehinderten Platten, Hohlyzylindern und Hohlkugeln bei linear veränderter Leittemperatur" [Approximation Equation Estimating the Nonstationary Heat Stresses in Obstruction-Curved Plates, Hollow Cylinders and Hollow Spheres with Linear Adjusted Guiding Temperature], VGB Kraftwerkstechnik, vol. 63, No. 10, Dec. 1983, pp. 915-925.

Speitkamp, L.: "Bestimmung von Temperaturdifferenzen in dicken Druckbehälterwänden aus der zeitlichen Folge von Temperaturmeßwerten an der isolierten Wandaußenseite" [Determination of Temperature Differences in Thick Pressure Vessel Walls From the Time Sequence of Temperature Measurement Values on the Insulated Outer Wall Surface], VGB Kraftwerkstechnik vol. 68, No. 2, Feb. 1988, p. 182-186.

\* cited by examiner

METHOD AND DEVICE FOR THE PROCESS REGULATION OR CONTROL OF THERMAL LOAD CHANGES OF AN OBSTRUCTION-CURVED AND/OR THICK-WALLED COMPONENT THROUGH WHICH A MEDIUM FLOWS IN A THERMAL SYSTEM

BACKGROUND OF THE INVENTION

Field of the Invention

The invention relates to a process regulation method or control method and to a device for a process regulation (closed-loop control) or control (open-loop) of thermal load changes in a thermal system. The thermal system of interest has an obstruction-curved and/or thick-walled component through which a medium flows.

Particularly in the operation of power stations, load changes are to be executed as economically as possible, cost-effectively, with short startup and rundown times and also with high efficiency. The speed of the transition from an existing operating point to a new operating point is thereby determined critically by the heat stresses occurring in the obstruction-curved and/or thick-walled components. Heat stresses are caused by the heating or cooling action associated with the load change and taking place on the components, such as occur, for example, where a turbine is started up and run down. To exert a controlled influence on the load changes, therefore, a knowledge of the heat transmission properties between the medium flowing through a component and the wall of the component and the incorporation of this knowledge in the regulating process are of critical importance.

Methods are known in which it is assumed that the temperature of the medium flowing through $T_s$, also designated hereafter as linearly variable guide temperature, is varied constantly in time, and that the wall temperatures of the component are subject to the same changes with a time offset.

Temperature differences can be estimated in this operating situation, as described in R. Pich: *Näherungsgleichungen zur Abschätzung der instationären Wärmespannungen in krümmungsbehinderten Platten, Hohlzylindern und Hohlkugeln* [Approximation Equation Estimating the Nonstationary Heat Stresses in Obstruction-Curved Plates, Hollow Cylinders and Hollow Spheres]. VGB Kraftwerkstechnik 63 (1983), No. 10, p. 915-925.

The heat stress in the component rises in correspondence with the increase in the rate of change of the temperature of the medium flowing through $T_s$. In this case, the rate of change of the temperature of the medium flowing through $T_s$ must be selected such that the maximum permitted heat stress is not overshot.

Under real practical conditions, the precondition, assumed in this method, for the constant heat transmission coefficient $\alpha$ between the medium flowing through the component and the wall of the component therefore cannot apply, because the heat transmission coefficient $\alpha$ is dependent greatly on the state of the medium and on the operating conditions, for example on the flow velocity of the medium.

If, for example, the medium used is steam, the heat transmission coefficient $\alpha$ varies, particularly when both saturated steam and superheated steam occur during the load change. Consequently, both the rise in the wall temperature and the time offset between the internal and the middle temperature of the component in the event of a variable heat transmission coefficient $\alpha$ are no longer constant. The applicability of the method is therefore restricted to only limited operating ranges.

To determine the heat stresses actually occurring in thick-walled components and in components with ideal insulation on the outside, a knowledge of the temperature difference $(T_m-T_i)$ between the wall inside and the wall middle of the component is necessary, this being derived from the measurement of the middle wall temperature $T_m$ and of the internal wall temperature $T_i$.

The temperature difference $(T_m-T_i)$ may be determined, for example, according to a method described by L. Speitkamp in *Bestimmung von Temperaturdifferenzen in dicken Druckbehälter-wänden aus der zeitlichen Folge von Temperaturmesswerten an der isolierten Wandaußenseite* [Determination of Temperature Differences in Thick Pressure Vessel Walls From the Time Sequence of Temperature Measurement Values on the Insulated Outer Wall Surface], VGB Kraftwerkstechnik 68 (1988), No. 2, p. 182-186. For this purpose, the temperature differences form a plurality of measurements at a defined location of the component at different time points are determined. The method is based on the analytic solution of the one-dimensional thermal conduction equation. The actual temperature profiles are approximated by means of polynomials, the order of the polynomial typically being four. Using the polynomial coefficients determined, local temperature profiles and, in particular, the local difference between the internal and the middle temperature on the component can be determined.

An ideal insulation or a knowledge of the heat transmission coefficient $\alpha$ on the outside of the component is a precondition for the application of this method.

One disadvantage of this method is the high outlay in computing terms which is incurred due to the large number of measurement values which are necessary for calculation and processing. For example, to determine the coefficients of a fourth-order polynomial, at least five temperature measurement values are required.

Particularly when relatively large operating ranges are spanned, the maximum permissible heat stress is only partially exhausted when the known methods are used. Furthermore, there is no incorporation of further medium properties, such as the mass flow and the pressure of the medium flowing through the component, into the control and regulation of the load changes.

SUMMARY OF THE INVENTION

Proceeding from the above-described prior art methods for starting up or running down technological components of technical processes, in which, when a medium having a medium property changing continuously in time, in particular the temperature, flows through an obstruction-curved and/or thick-walled component, the heat stresses of the latter likewise change constantly, albeit with a time offset, it is an object of the present invention to specify a process regulation or control method which, by a change in the medium properties, in particular temperature, of the medium flowing through a component, implements a maximum utilization of the permissible heat stresses of the component for a cost-effective thermal load change. It is a further object to specify a device for carrying out the method according to the invention.

With the foregoing and other objects in view there is provided, in accordance with the invention, a control method in a thermal system containing a component (an obstruction-curved component and/or a thick-walled component) through which a medium flows, the method which comprises:

detecting wall temperatures of the component;

determining a heat flux density of a heat flux from the medium into a wall of the component;

determining a respective heat transmission coefficient from the wall temperatures and the heat flux density; and determining a heat transmission coefficient and using the heat transmission coefficient to influence properties of the medium, and thereby taking into account heat stresses in the component.

A device for carrying out the novel method is provided as well.

In accordance with an added feature of the invention, the method may be implemented as a closed-loop control method, as an open-loop control method for regulating the thermal system, or as a mixed system. As used herein, the terms "regulation" or "regulating" relate to closed-loop control and the term "control" generally relates to open-loop control or, more generically, to both or mixed types of system control.

With the above and other objects in view there is also provided, in accordance with the invention, and in combination with a thermal system containing a component conducting a flow of a medium, a process control device, comprising:

a subordinate control loop configured to process a conventional closed-loop control;

an optimizer/desired-value generator connected on an input side of the subordinate control loop, and a feedback for inputting into the optimizer/desired-value generator an output variable fed back from the real process, and process variables transmitted from the thermal system to the process;

the optimizer/desired-value generator determining optimized desired-value profiles for the subordinate control loop from stipulated efficiency criteria, from the output variable, and from the process variables.

The method according to the invention is based on the fact that medium properties of the medium flowing through the component are influenced in such a way that as efficient a load change as possible is achieved. The actual time profiles of the medium properties are derived with the aid of an efficiency criterion.

A high efficiency of the load change is achieved, as a rule, by the maximum utilization of the permissible heat stresses on the component in which the medium flows.

In this context, in addition to the medium temperature, further medium properties, such as, for example, mass flow and pressure, are also taken into account. The mass flow of the medium critically influences the heat transmission between medium and wall. With this property being utilized, the heat stress in the wall of the component is influenced by means of a controlled variation in the mass flow.

The medium pressure, too, influences both the heat transmission and the heat stresses in the wall of the component and is therefore likewise influenced in a controlled manner.

For exerting a controlled influence on the heat stresses in the component by means of the medium properties, a knowledge of the heat transmission properties between the medium and the wall of the component is of critical importance. If no functional relation between the medium properties and the heat transmission coefficient $\alpha$ between the medium and the wall of the component is known, it is necessary that the heat transmission coefficient $\alpha$ to be determined from the existing measurements for the medium temperatures and wall temperatures.

For this purpose, in the first place, the existing measurements of the wall temperature of the component are detected, in order to determine the heat flux density q of the heat flux from the medium into the wall of the component.

To determine the heat flux density, a broadening of the method, known from the prior art, of L. Speitkamp: *Bestimmung von Temperaturdifferenzen in dicken Druckbehälterwänden aus der zeitlichen Folge von Temperaturmesswerten an der isolierten Wandaußenseite* [Determination of Temperature Differences in Thick Pressure Vessel Walls From the Time Sequence of Temperature Measurement Values On the Insulated Outer Wall Surface], VGB Kraftwerkstechnik 68(1988), No. 2, p. 182-86 for the analytic solution of the one-dimensional thermal conduction equation is employed to the effect that the thermal conduction equation is used not only for determining temperatures that are not measured, but also for determining the nonmeasurable heat flux density from the medium into the wall.

For a cylindrical form of construction, important in practice, of the wall of the component with an insulated outer wall surface, an analytic solution of the temperature profile T(r) manifested under stationary heat flux conditions is known from Carslaw and Jaeger, *Conduction of Heat in Solids*, 2$^{nd}$ ed., Oxford University Press, 1959. The equation is as follows:

$$T_m - T(r) = -\frac{qr_i}{\lambda}\left[\left(\frac{r_o^2}{r_o^2 - r^2}\right)^2 \ln\frac{r_o}{r} - \frac{3r_o^2 - r^2}{4(r_o^2 - r^2)}\right], r_i \le r < r_o \quad (1)$$

The influencing variables on the temperature profile T(r) are the thermal conductivity $\lambda$, the radius r, the inner radius $r_i$ and the outer radius $r_o$ for the cylindrical wall of the component.

The relationship (1) for determining the stationary heat flux conditions makes it possible to determine nonmeasured wall temperatures and heat flux densities q even from two available temperature measurement values for the wall of the component.

A reduction in the outlay in computing terms, as compared with the method known from the prior art, presupposes stationary heat flux conditions in which the heat flux density q of the heat flux from the medium into the wall is constant in time and the wall temperatures undergo a linear variation as a function of time. The relation (1) can thus be employed, in particular, for this situation, important in practice, in which a permissible temperature difference $(T_m-T_i)$ is to be kept constant for a long time during a load change.

Using the relation for stationary heat flux conditions (1), then, the heat flux density q from the medium into the wall of the component is determined by the following method.

$$q = \frac{\lambda(T_m - T_i)}{r_i\left[\left(\frac{r_o^2}{r_o^2 - r_i^2}\right)^2 \ln\frac{r_o}{r_i} - \frac{3r_o^2 - r_i^2}{4(r_o^2 - r_i^2)}\right]} \quad (2)$$

The heat flux density q, determined by the novel method (2) presented here or by another method according to the prior art, of the heat flux from the medium into the wall is then used in order to determine the heat transmission coefficient $\alpha$ between the medium and the wall of a component. For a known medium temperature $T_s$, the instantaneous heat transmission coefficient $\alpha$ is obtained according to the relation $$\alpha = \frac{q}{T_s - T_i} \quad (3)$$

In the determination of the heat flux density q and of the heat transmission coefficient α resulting from this, it is assumed that the actual internal wall temperature $T_i$ is known.

Under real practical conditions, however, there is, as a rule, a residual thickness between the temperature measurement point on the component and the temperature on the wall inside the component. If, in this case, the residual internal thickness is not negligible, the calculation can be broadened correspondingly, based on the generally analytically known temperature profile in the wall of the component.

The heat transmission coefficient α determined by means of the relation (3) is advantageously used in order to influence the medium properties in a controlled manner according to the efficiency criterion and at the same time to maintain permissible heat stresses, as a result of which, for example, the maximum permissible medium temperature $T_s$ at which a permitted temperature difference $(T_m - T_i)$ is exhausted can be determined.

Since the heat transmission coefficient α varies in the event of changing medium properties, its instantaneous value is adapted to the profile of the load change, in order to achieve an efficient load change, in particular with regard to the costs, the reduction in the startup time required and the energy consumption during a load change.

Other features which are considered as characteristic for the invention are set forth in the appended claims.

Although the invention is illustrated and described herein as embodied in a method and device for the process regulation or control of thermal load changes of an obstruction-curved and/or thick-walled component through which a medium flows in a thermal system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
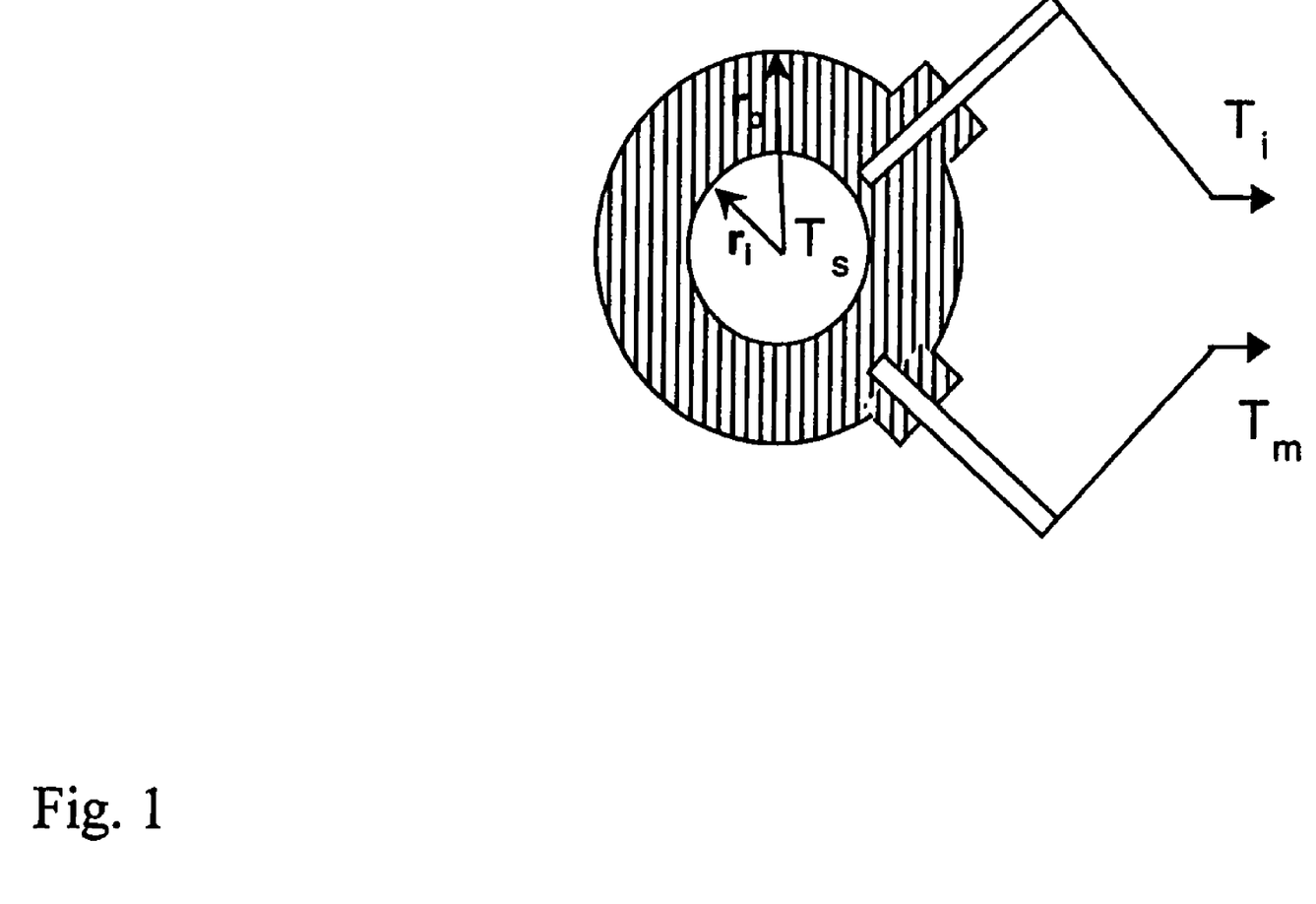
FIG. 1 is a cross section taken through an obstruction-curved and/or thick-walled component.

Referring now to the figures of the drawing in detail and first, particularly, to FIG. 1 thereof, there is shown a cross section through an obstruction-curved and/or thick-walled component. Heat stresses in thick-walled and/or obstruction-curved components can be determined by computation from the temperature difference between the inner wall surface (at or very close to the inner surface) and the center of the wall of the component. The component has flowing through it in the middle a medium, for example steam, having a temperature $T_s$. The component is heated or cooled from-the middle during a load change, that is to say, for example, in the event of a changing temperature $T_s$ of the medium flowing through the component.

As a result, a temperature difference $T_m - T_i$) between the middle wall temperature $T_m$ and the internal wall temperature $T_i$ occurs, which is required for determining the heat flux density q of the heat flux from the medium into the wall.

Figure 2:
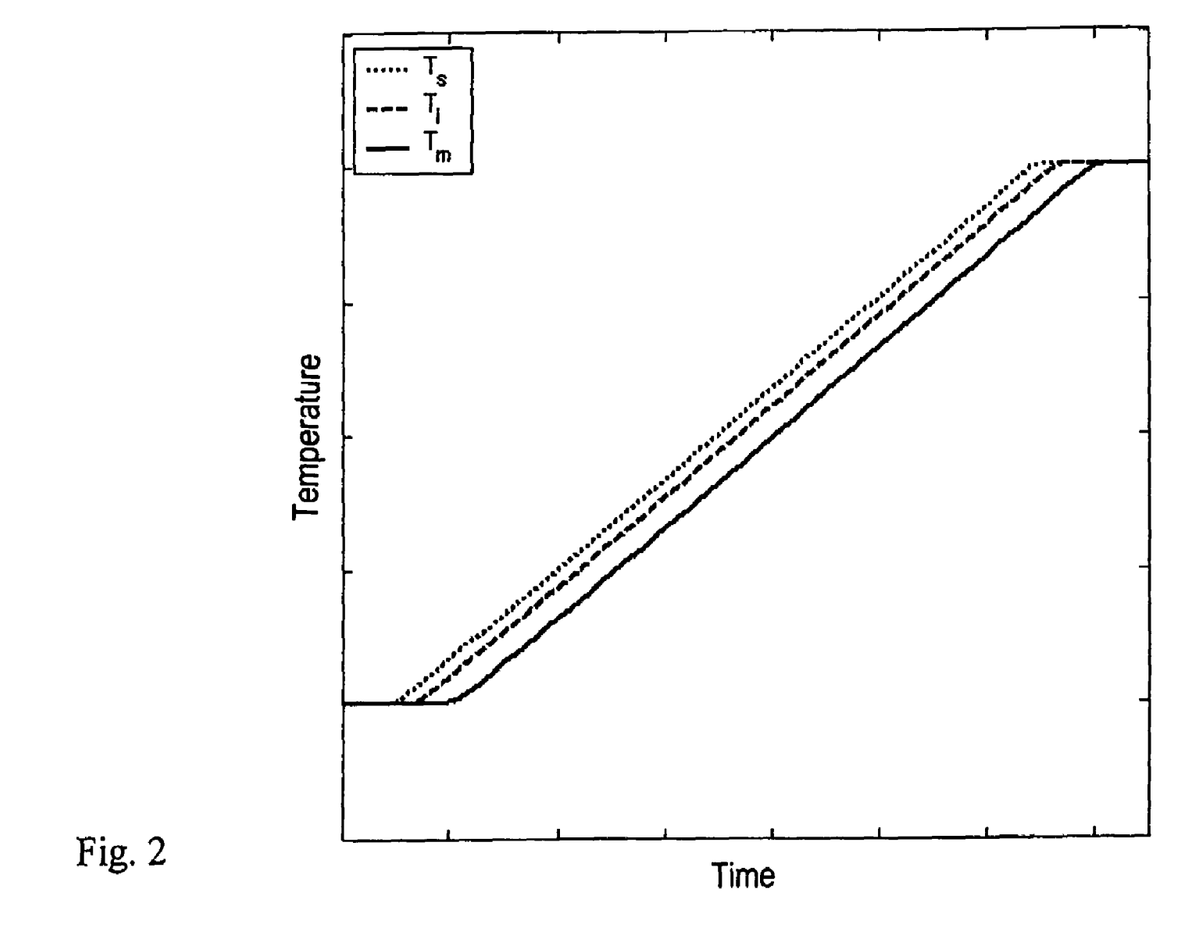
FIG. 2 is a graph plotting an imaginary profile of the wall temperatures during an exemplary traditional startup process in the case of a linearly varied guide temperature.

FIG. 2 shows an imaginary profile of linearly changing wall temperatures $T_m$ and $T_i$ during an exemplary traditional startup process in a power station as a function of time in the event of a linearly varying guide temperature $T_s$. A real change in heat transmission coefficient (α) is not being taken into account.

Figure 3:
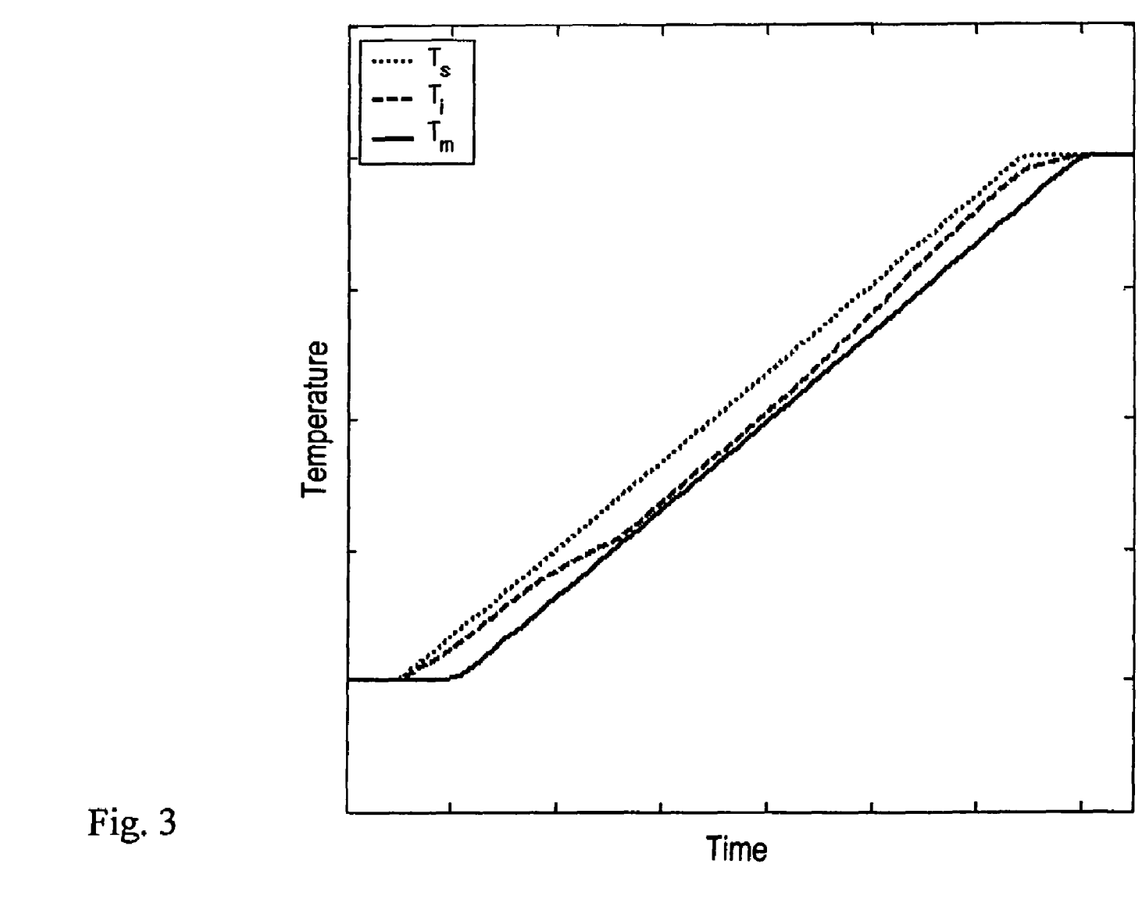
FIG. 3 is a similar view of a actual profile of the wall temperatures in the case of a linearly varied guide temperature and of varying heat transmission coefficient.

The actual profile of the change in wall temperature $T_m$ and $T_i$ is shown in FIG. 3. Under the influence of the varying heat transmission coefficient α, a nonlinear change in the internal wall temperature $T_i$ in the event of a linearly changing middle wall temperature $T_m$ can then be recognized.

Figure 4:
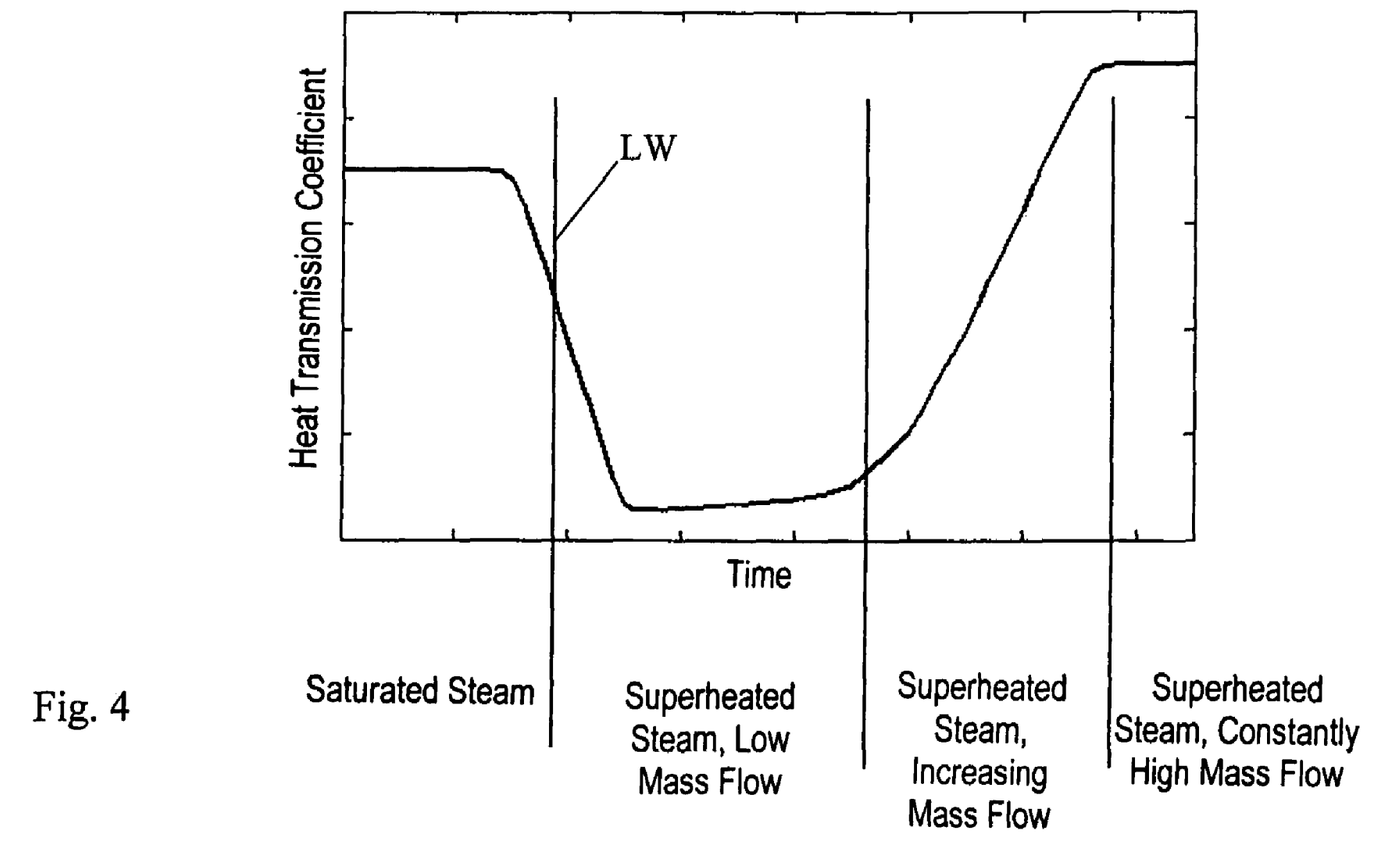
FIG. 4 is a typical profile of the heat transmission coefficient between a medium and the wall of the component during an exemplary startup process.

The typical nonlinear profile for the varying heat transmission coefficient α between steam as the medium and the wall of the component during a startup process over a defined time is shown in FIG. 4.

The dependence of the heat transmission coefficient α on the operating conditions during a load change LW and on the state of the steam which flows through the component is shown by the example of the change in mass flow. The influence, to be taken into account, of the heat transmission coefficient α, particularly when both saturated steam and superheated steam occur during the load change LW, can be seen.

Figure 5:
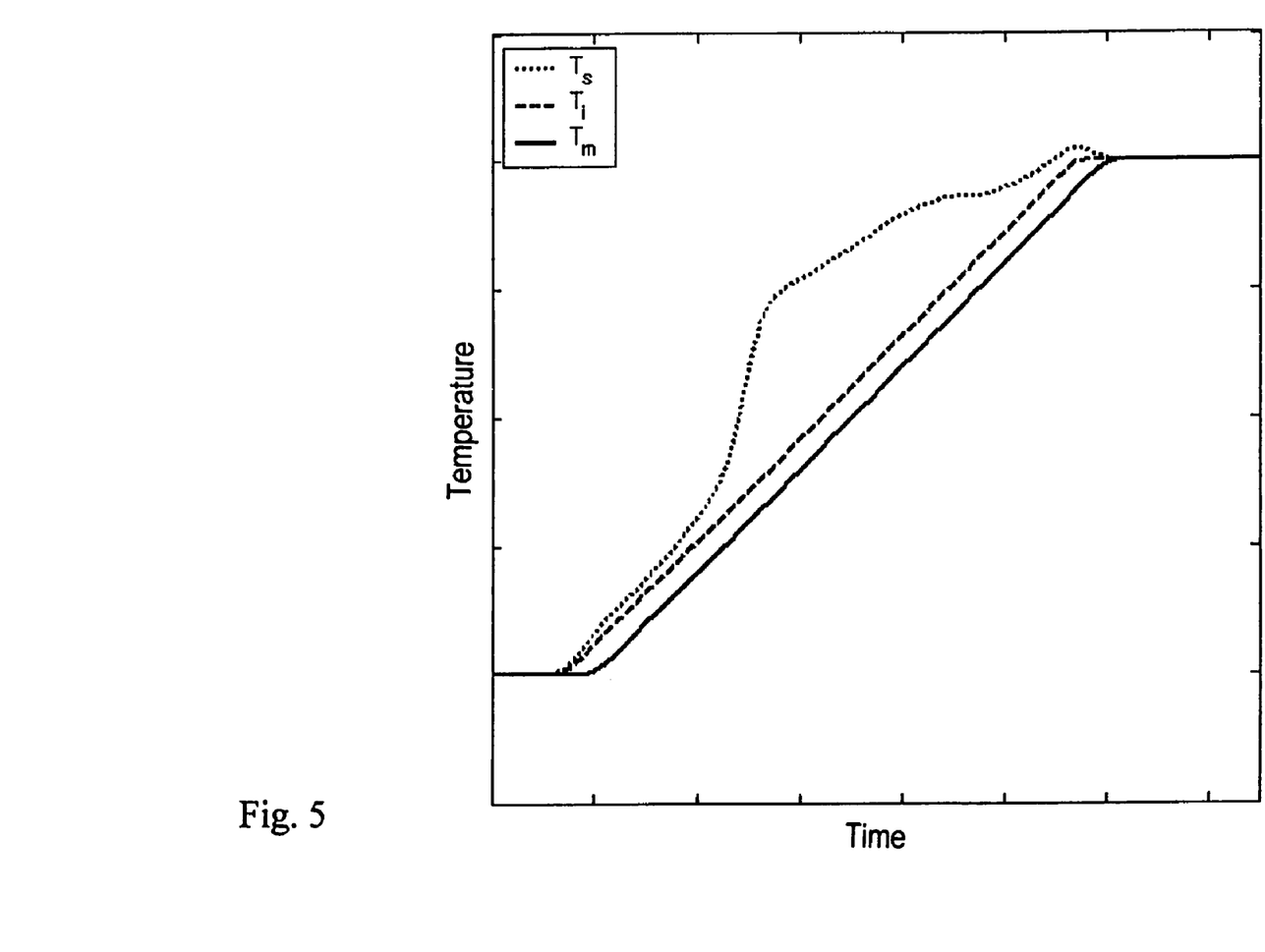
FIG. 5 is a profile of the medium temperature which, utilizing the profile of the heat transmission coefficient, implements a constant rise in the internal wall temperature and in the middle wall temperature.

Taking into account the influence of a real heat transmission coefficient α on the temperature $T_s$ of the medium flowing through the component leads to a profile of the medium temperature $T_s$, as illustrated in FIG. 5.

It can be seen that a constant rise in the internal wall temperature $T_i$ and in the middle wall temperature $T_m$ during the load change LW can be achieved via a variation in the temperature of a medium flowing through $T_s$.

Figure 6:
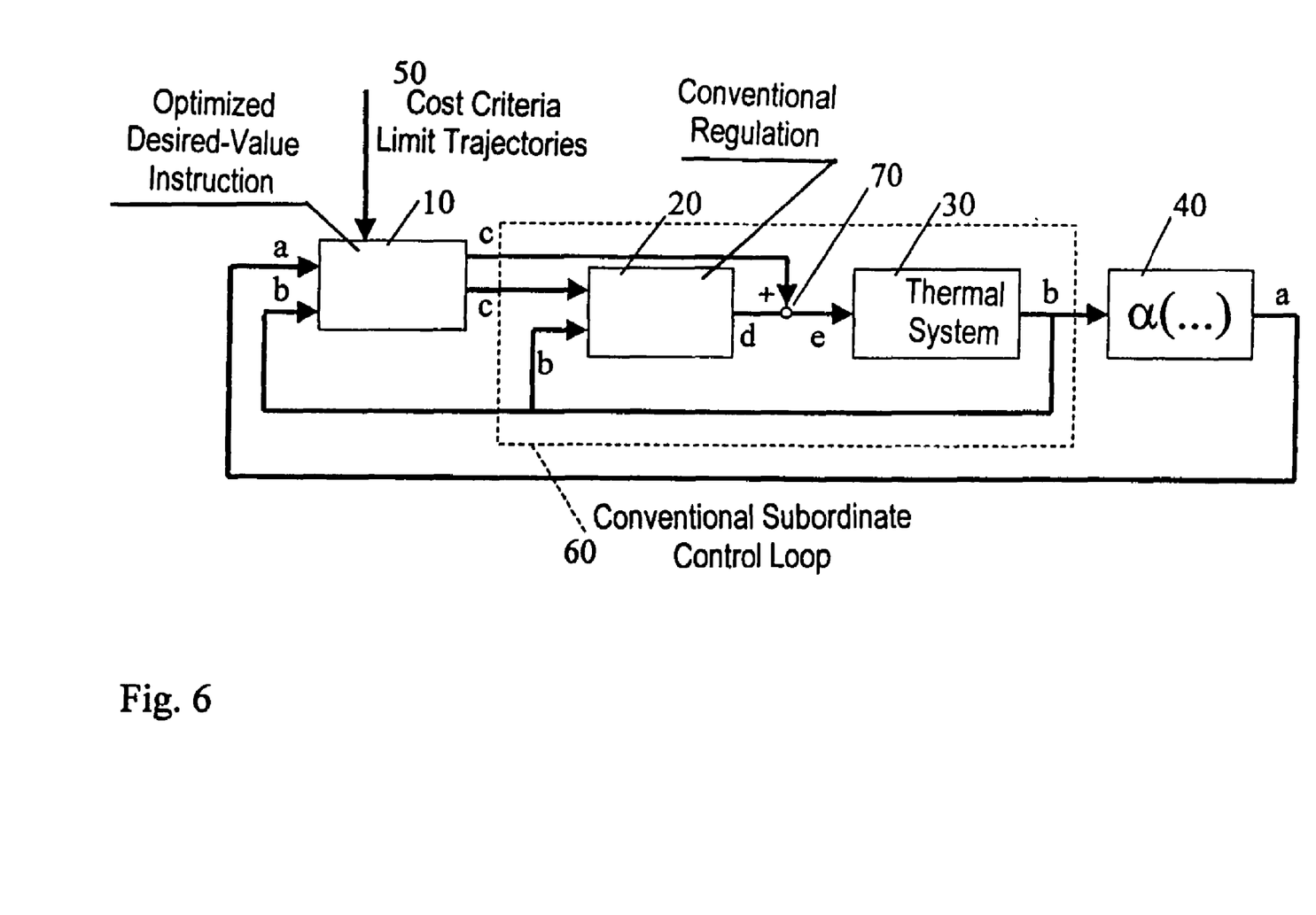
FIG. 6 is an illustration of a regulating device based on the method according to the invention.

FIG. 6 shows an illustration of a device, based on the method according to the invention, for regulating an industrial process 40 and for exerting a controlled influence on the medium properties of the medium flowing through the component, for an efficient load change as a result of the special heat transmission model, described in the method according to the invention, for the thermal system 30.

In this case, in particular, the heat transmissions which are actually present in the real process 40 and which arise from the heat flux from the medium into the wall of the component are taken into account.

The heat transmissions actually present between medium and component are transferred as an output variable a from the real process 40 to an optimizer/desired-value generator 10.

Via conventional regulation 20, which precedes the thermal system 30 and with the thermal system 30 forms a conventional subordinate control loop, the optimizer/desired-value generator 10 determines optimized desired-value profiles c from stipulated efficiency criteria 50, from the process output variables b which the thermal system 30 feeds to the real process 40 and from the output variables a fed back from the real process 40.

The efficiency criteria are optimized, for example, by means of cost criteria and limit trajectories 50 which are likewise fed to the optimizer/desired-value generator 10. At the same time, both process restrictions and heat stresses in the thermal system 30 are maintained. The optimized desired-value profiles c are transferred to the conventional subordinate control loop 60.

The conventional regulation 20 of the subordinate control loop 60 determines, from the optimized desired-value profiles c of the optimizers/desired-value generator 10 and from the feedback process output variables b of the thermal system 30, a desired value d which is added to the optimized desired-value instruction c at an adder or addition point 70 and is transferred as an actuating variable e to the thermal system 30.

Pilot controls for the subordinate control loops 60 can also be derived from the optimized desired-value profiles c of the optimizer/desired-value generator 10.

In a further embodiment of the device according to the invention for controlling the thermal load changes LW on the component, the optimizer/desired-value generator 10 delivers, instead of the optimized desired-value profiles c, actuating values which are transferred directly to the process 40.

This application claims the priority, under 35 U.S.C. § 119, of German patent application No. 103 11 223.5, filed Mar. 14, 2003; the disclosure of the prior application is herewith incorporated by reference in its entirety.

We claim:

1. A control method in a thermal system containing an obstruction-curved and thick-walled component through which a medium flows, the method which comprises:
   detecting a temperature difference between the middle wall temperature and the internal wall temperature of the component;
   determining a heat flux density of a heat flux from the medium into a wall of the component;
   determining a respective heat transmission coefficient between the medium flowing through the component and the wall off the component from the temperature difference between the middle wall temperature and the internal wall temperature and the heat flux density; and
   using the heat transmission coefficient to influence properties of the medium, and thereby taking into account heat stresses in the component.

2. The method according to claim 1, which comprises implementing the process steps in a closed-loop control method for regulating the thermal system.

3. The method according to claim 1, which comprises implementing the process steps in an open-loop control method for regulating the thermal system.

4. The method according to claim 1, wherein the step of determining the heat transmission coefficient comprises measuring the wall temperatures of the component at an inside of the wall and substantially in a center of the wall of the component, and determining the heat flux density from the medium into the wall from the wall temperatures.

5. The method according to claim 1, which comprises determining the heat flux density from the medium into the wall of the component by calculating $$q = \frac{\lambda(T_m - T_i)}{r_i \left[ \left( \frac{r_o^2}{r_o^2 - r_i^2} \right)^2 \ln \frac{r_o}{r_i} - \frac{3r_o^2 - r_i^2}{4(r_o^2 - r_i^2)} \right]},$$

where is a temperature difference between the wall temperature substantially at a center of the wall and a wall temperature at an inner part of the wall of the component, $\lambda$ is the thermal conductivity, $r_i$ is an inner radius and $r_o$ is an outer radius of the wall of the component.

6. The method according to claim 1, which comprises determining the heat transmission coefficient from:

$$\alpha = \frac{q}{T_s - T_i},$$

where $T_s$ is a temperature of the heat flux from the medium into the wall of the component, $T_i$ is a wall temperature at an inner wall surface of the component, and q is the heat flux density.

7. The method according to claim 1, wherein the component is a component part of a power station, and the heat transmission coefficient changing with the varying medium properties is adapted to a profile of a load change in the power station.

8. The method according to claim 7, which comprises including in the properties of the medium a temperature, a mass flow, and a pressure from the medium into the wall of the component.

9. The method according to claim 1, which comprises, taking into account a temperature difference between a measured internal wall temperature and a real temperature on an inner wall of the component, integrating an analytically known temperature profile in the wall of the component into the step of determining the heat transmission coefficient.

10. A process-control device, comprising interconnected control and closed-loop control modules configured to carry out the method according to claim 1.

11. A control method in a thermal system containing an obstruction-curved and thick-walled component part of a power station, through which a medium flows, the method which comprises:
   detecting a temperature difference between the middle wall temperature and the internal wall temperature of the component;
   determining a heat flux density of a heat flux from the medium into a wall of the component;
   determining a respective heat transmission coefficient between the medium flowing through the component and the wall of the component from the temperature difference between the middle wall temperature and the internal wall temperature and the heat flux density; and
   using the heat transmission coefficient to influence properties of the medium in a controlled manner according to an efficiency criterion and to maintain permissible heat stresses; and
   adapting the heat transmission coefficient changing with the varying medium properties to a profile of a load change in the power station.

* * * * *